Sept. 1, 1931. H. H. WILKERSON 1,821,861
GRAIN HEADER
Filed Dec. 2, 1930 2 Sheets-Sheet 1
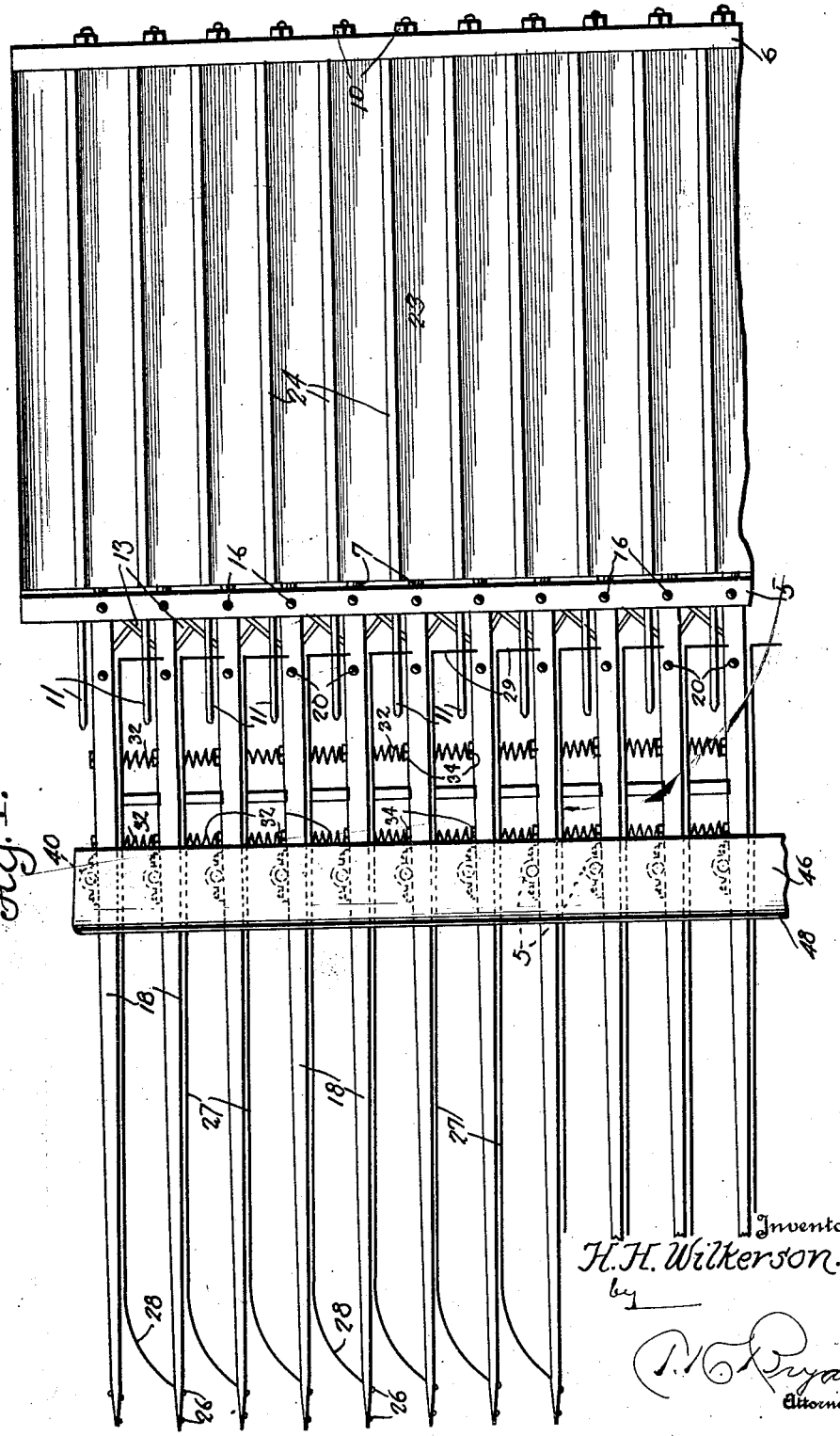

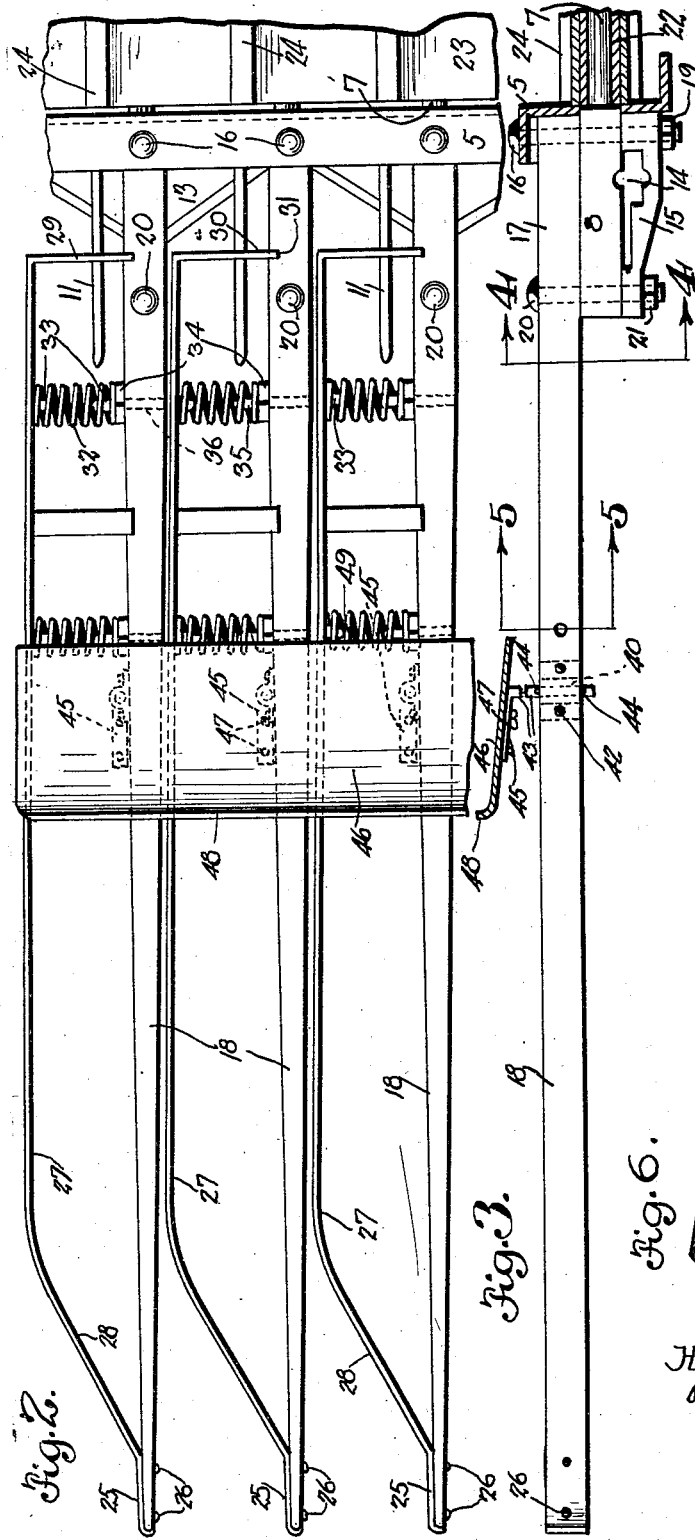

Patented Sept. 1, 1931

1,821,861

UNITED STATES PATENT OFFICE

HENRY H. WILKERSON, OF QUAY, NEW MEXICO

GRAIN HEADER

Application filed December 2, 1930. Serial No. 499,563.

This invention relates to improvements in grain headers of the type particularly adapted for heading sorghum crops and comprises a series of forwardly projecting guard members, adapted to be carried adjacent the cutting bar or sickle of a grain header, in close relation to the usual grain guards or fingers which are commonly employed in connection with grain headers now on the market. Also, the invention comprises a metallic spring member extending from the tip of each of the supplemental guard fingers to the rear portion thereof where they are resiliently supported against lateral thrust, whereby grain may pass between the series of supplemental guard fingers and metallic spring members which may grip the grain close to the head in order that the same may be cut by the sickle or scythe, at this point. Also, carried by the supplemental guard finger supporting bar are a series of round bars having one of their ends passing through an opening in the guard finger supporting bar and bolted to the rear portion of each of the supplemental guard fingers. The opposite end of the round bar is supported by a similar guard finger supporting bar and a conveyor may be supported by the round bars having rollers thereon at spaced intervals. The invention further comprises a grain tucker adapted to be carried intermediate the ends of the supplemental guard fingers and extending thereover whereby the grain stalk may be slightly bent while passing between the supplemental guard fingers and the metallic spring members.

Heretofore, it has been proposed to attain objects which are set forth by this invention by providing devices including supplemental guard fingers mounted between the conventional form of guard fingers employed on cutting bars for grain headers and the same are not provided with longitudinally disposed gripping spring members, nor are they mounted relative to the cutting bar in such a manner as to produce the desired results.

Other objects and advantages of the invention will become apparent during the course of the following description, forming a part of this specification and in which, Figure 1 is a top elevation, illustrating a series of the supplemental guard fingers in place relative to the cutting bar or scythe and the relation of the supplemental guard fingers to the endless conveyor is also illustrated;

Figure 2 is a top elevation enlarged and partly broken away to illustrate more in detail the construction of the supplemental guard finger, metallic gripping members and grain tucker carried by the supplemental guard finger;

Figure 3 is a longitudinal cross-sectional view taken on line 3—3 of Figure 2, illustrating the manner in which the supplemental guard fingers are connected to the guard finger supporting bar or angle iron and the manner in which a scythe or sickle is supported is also shown. It will be noted that the conveyor roller supporting bar is shown in cross-section for showing the manner in which the same is connected to the supplemental guard finger and the transverse angle iron.

Figure 4 is a transverse cross-sectional view, taken on line 4—4 of Figure 3, illustrating the same in enlarged form and showing the relative position of the supplemental guard fingers to the conventional guard finger and illustrating the manner in which the same are connected to the cutting bar;

Figure 5 is a transverse cross-sectional view taken on line 5—5 of Figure 3, showing the manner in which the spring gripping fingers are resiliently supported from the supplemental guard fingers and also illustrating the manner of loosely supporting the free ends of the spring gripping members; and Figure 6 is a perspective view of the grain tucker illustrating the same in detail.

In the drawings, wherein for the purpose of illustration is shown a preferred embodiment of the invention, wherein like reference characters are employed to designate like parts throughout the same, the reference characters 5 and 6 will generally be employed to designate a pair of laterally extending angle irons which extend from the side of a harvester and grain threshing machine and passing transversely through the angle irons 5 and 6 are a series of bars 7 having a squared portion 8 at one end thereof adapted to be received in a squared opening 9 in the web portion of the angle iron 5. The opposite end of the round bar 7 is anchored in the angle bar 6 by means of nuts 10 threaded on screw threaded portions on the round bars 7.

The conventional guide bars 11 are secured to the web portion of the angle bar 5 by means of a round boss thereon passing through an opening 12 in the web portion of the angle bar 5 and is anchored in the angle bar 5 by means of nuts threaded on screw threaded portions on the round boss, as clearly illustrated in Figure 5. A sickle or scythe, also of conventional form, is represented by the reference character 13 and the sickle or scythe 13 is adapted to pass through a cut-out portion 14 formed in a block 15 bolted to the block 8 which is also provided with a cut-out portion to receive the opposite side of the sickle or scythe and to thereby guide the same in its horizontal movement. The block 15 is bolted to an integral squared part of the round bar 7 and these two members are connected together by means of bolts 16 passing through an angle portion of the angle bar 5 which passes through the rear portion 17 of the supplemental guard fingers 18. Further, the bolt 16 passes through the squared portion 8 of the round bar 7 and through the member 15 whereby the same may be held in place by a nut 19 threaded on the ends of the bolts 16.

The bolt 20 may also pass through the rear portion 17 of the supplemental guard fingers 18, squared portion 8 and the scythe supporting member 15 whereby the parts may be held in place by a nut 21 threaded on the end of the bolt in order to form a more rigid construction. The round portion 7 of the squared end 8 may be provided with wooden rollers 22 rotatably mounted thereon and it is preferably desirable to space the wooden rollers 22 upon different rounded portions 7 of the bar 8 preferably two feet from each other for supporting the usual endless conveyor 23 having strengthening ribs of wood or the like 24. It is to be understood that any number of wooden rollers 22 mounted on the round bars 7 may be placed on alternate bars thereby leaving four or more bars 7 in between, which may be provided with metallic pipes merely functioning to provide spacers between the angle irons 5 and 6. It is also to be noted that the round bars 7 are positioned centrally relative to the web portion of the angle bar 5 in order that the same will not interfere with the operation of the endless conveyor 23 and in order that the same will assist in supporting the conveyor when the same is under load.

Each of the supplemental guard fingers 18 extend forwardly in parallel relation from the transverse angle iron 5 and the same may be tapered forwardly into a pointed portion upon which is adapted to be secured the front end of a spring gripping member 27 by means of rivets or screws 25. The spring gripping member 27 is provided with a curved portion 28 whereby the spring gripping member 27 may extend nearly parallel for its whole length with the supplemental guard fingers 18. The free ends of each of the spring gripping members 27 are provided with an angle portion 29 which is presented to the edge or the side of the supplemental guard fingers 18. The spring gripping members 27 are resiliently supported from the supplemental guard fingers 18 and are adapted to be normally held away therefrom by means of coil springs 32 having one of their ends received and engaging the spring gripping members by means of a boss 33 while the opposite end of the coil springs 32 abut against a nut 34 which may be adjusted for regulating the tension of the springs 27. A boss 35 is formed integral with the nut 34 for centering the springs 32. The boss 35 may be secured to the supplemental guard fingers 18 by means of extensions 36 more clearly illustrated in Figure 2 passing through openings 37 in the supplemental guard fingers.

On one side of each of the supplemental guard fingers 18 is provided a bearing 40 having ears 41 adapted to lie flush with the side of the supplemental guard finger 18 and held in place thereon by means of bolts or rivets 42. The bearings 40 are adapted to receive the lower end of a rod 43 which is held against vertical movement by cotter keys 44 above and below the bearing block 40. The upper end of each of the vertical rods 43 are bent at an angle as at 45 terminating therein and adapted for connection to a grain tucker 46 by means of rivets 47. The grain tucker 46 comprises an elongated strip of metal having its forward edge upturned as at 48 whereby the forward edge 48 may be in a higher plane than the rear edge 49. As illustrated in Figure 3, the grain tucker 46 is inclined at an angle in order to bend the grain stalk before it is operated upon or presented to the cutting scythe or sickle.

It is to be noted that the spring gripping members 27 extend parallel with the alternate adjacent supplemental guard fingers 18 and are in close proximity thereto whereby the grain may pass therebetween and the head of the stalk may be removed therefrom leaving a larger portion of the stalk than has heretofore been accomplished. Particular attention is also directed to the manner in which the round bar 7 is secured to the web portion of the angle bar 5 and the manner in which the squared bar 8 of the round bar 7 is sandwiched between the sickle supporting member and the rear portion 17 of the guard finger 18.

For a consideration of the operation of the grain heading machine, attention is directed to Figure 1, wherein is shown the supplemental guard fingers in their assembled position interposed between the conventional form of guard fingers 11 secured to the channel iron 5 which forms a support for the endless conveyor 23. As the device is moved along the ground, the grain is guided by the supplemental guard fingers 18 and the operative face of the spring gripping members 27 and as the machine moves forward the grain is gripped more tightly before being presented to the reciprocating sickle 13. In this manner, grain may be headed more closely to the top of the stalk, due to the fact that it is frictionally held between the metallic spring gripping members 27 before being operated upon by the sickle or scythe 13.

It is to be understood that the form of the invention herewith shown and described, is to be taken as a preferred embodiment of the invention, and that various changes in the shape, size and arrangement of parts may be resorted to without departing from the spirit of the invention or the scope of the subjoined claims.

Having thus described the invention, what is claimed is:—

1. A supplemental attachment for grain headers, comprising a series of supplemental guard fingers secured to the cutting bar of a grain header, metallic spring strips having one of their ends rigidly secured to the forward end of each of the supplemental guard fingers and the rear end resiliently supported from the rear portion of the guard fingers.

2. A supplemental attachment for grain headers, of the character described, comprising a plurality of supplemental grain fingers interposed between the conventional grain fingers on a grain heading machine, a spring strip for each of the supplemental grain fingers secured to the forward or tip portion in a rigid fashion and resilient means carried by the sides of each of the supplemental grain fingers for resiliently supporting the rear or free end of the metallic spring strip.

3. In combination with a grain harvester, and threshing machine, having laterally extending angle irons, and grain guards secured to one of the angle irons adjacent the sickle, of a series of supplemental guard fingers interposed between each pair of grain guard fingers, means for securing the supplemental guard fingers to each pair of angle irons, and resilient gripping means secured to one side face of each of the supplemental guard fingers.

4. In combination with a grain harvester, or thresher, having laterally extending angle irons, and guard fingers secured to one of the angle irons adjacent the cutting bar thereof, of a series of supplemental guard fingers mounted between the grain guard fingers, said supplemental guard fingers comprising a longitudinal wedge-shaped member adapted to be supported by the angle iron adjacent the sickle, and means secured on one side face of the supplemental guard finger for frictionally engaging the grain, whereby the same will be frictionally held before being presented to the reciprocating sickle of the harvesting machine.

5. In combination with a grain header having a pair of laterally extending angle bars, a reciprocating sickle and a grain conveyor, of a series of supplemental grain fingers carried by one of the angle bars extending laterally from the grain header adjacent the sickle, a metallic spring strip having its forward end secured to the forward end of each of the supplemental grain fingers and its rear end resiliently supported adjacent the rear end of the grain guard and an elongated member supported above the supplemental guard fingers for bending the grain stalks being operated upon.

6. In combination with a grain header having a pair of laterally extending angle irons, a reciprocating sickle and an endless conveyor, of a series of supplemental guard fingers carried by one of the angle irons, said supplemental guard fingers being rigidly secured to the angle bars, a supporting block for each of the supplemental guard fingers, including a block bolted to the rear portion of the supplemental guard fingers, having a reduced portion which is adapted to pass through the angle bar and form a roller support for the endless conveyor of the grain header, and a metallic strip having one of its ends rigidly secured to the forward end of each of the supplemental guard fingers and its rear or free end resiliently supported by the rear portion of the guard fingers adjacent one of the angle irons, whereby the grain being operated upon will be presented to the reciprocating cutting sickle.

7. In combination with a grain header having a pair of laterally extending angle irons and grain guard fingers secured to one of the angle irons, of a series of round bars connecting the laterally extending channel irons having a square block portion thereon, rollers rotatably mounted on each of the connecting round bars, an endless conveyor passing over the rollers, a supplemental guard finger secured to the block, a reciprocating sickle slidably mounted and supported by the supplemental guard support, a supplemental guard finger supported by the supplemental guard support, bolts passing through the rear portion of each of the supplemental guard fingers and supplemental guard supports whereby the same will be held to one of the angle irons and a metallic spring strip carried by the side face of each of the supplemental guard fingers whereby the grain being operated upon will be gripped at the highest possible point on the stalk before being presented to the reciprocating sickle.

8. The combination with a grain header having a pair of laterally extending angle irons and grain guard fingers secured to one of the angle irons, and a series of round bars connecting the laterally extending channel irons having a square block portion thereon, rollers rotatably mounted on each of the connecting round bars, an endless conveyor passing over the rollers, a supplemental guard finger secured to the block, a reciprocating sickle slidably mounted and supported by the supplemental guard support, a supplemental guard finger supported by the supplemental guard support, bolts passing through the rear portion of each of the supplemental guard fingers and supplemental guard supports whereby the same will be held to one of the angle irons, a metallic spring strip carried by the side face of each of the supplemental guard fingers for frictionally gripping the grain stalks being operated upon and a grain tucker mounted above the supplemental guard fingers and supported thereby.

9. A grain header of the character described, comprising a pair of lateral angle irons adapted to be supported by a wheeled frame, a conveyor supported by the angle irons, a cutting bar associated and supported by one of the angle irons, guard fingers carried in spaced relation on one of the supporting bars, supplemental guard fingers interposed between the guard fingers also supported by one of the angle bars, a spring strip extending from the tip of each of the supplemental guard fingers to the rear portion thereof, and means for resiliently supporting the free ends of the metallic spring strips, bearings carried by each of the supplemental guard fingers on the side face thereof, vertical rods supported in the bearings, an elongated grain tucker connecting the upper end of each of the vertical rods and said grain tucker being presented at an angle inclined upwardly to the forward movement of the machine.

10. A grain header of the character described, comprising guard fingers, supplemental guard fingers supported in spaced relation between the guard fingers, a metallic spring strip extending from the tip of each of the supplemental guard fingers to the rear portion thereof, means for resiliently supporting the free portion of the metallic spring strips, bearings carried by the side faces of each of the supplemental guard fingers, vertically extending rods supported within the bearings, an elongated metallic strip secured to the upper ends of the vertical rods and said elongated strip having its forward portion or edge bent upwardly in order to engage the grain stalk and bend the same for being operated upon by the grain harvester.

In testimony whereof I affix my signature.

HENRY H. WILKERSON.